(12) United States Patent
Mallet

(10) Patent No.: US 11,272,100 B2
(45) Date of Patent: Mar. 8, 2022

(54) SYSTEM AND DEVICE HAVING A MOBILE APPLICATION EXECUTED THEREON TO RECORD AREAS AROUND AND WITHIN A VEHICLE, AND TO PROVIDE DIRECT AUDIO-VISUAL AND/OR TEXTUAL TELEPHONIC CONTACT WITH A LICENSED ATTORNEY WITHIN A PREDETERMINED JURISDICTION BASED ON A LOCATION OF A USER

(71) Applicant: Jacqueline Mallet, Adamstown, MD (US)

(72) Inventor: Jacqueline Mallet, Adamstown, MD (US)

( * ) Notice: Subject to any disclaimer, the term of this patent is extended or adjusted under 35 U.S.C. 154(b) by 0 days.

(21) Appl. No.: 16/043,158

(22) Filed: Jul. 24, 2018

(65) Prior Publication Data

US 2020/0186707 A1 Jun. 11, 2020

(51) Int. Cl.
*H04N 5/232* (2006.01)
*G06Q 50/18* (2012.01)
*H04N 7/15* (2006.01)
*H04N 7/18* (2006.01)

(52) U.S. Cl.
CPC ......... *H04N 5/23238* (2013.01); *G06Q 50/18* (2013.01); *H04N 7/155* (2013.01); *H04N 7/188* (2013.01); *G06T 2207/30232* (2013.01)

(58) Field of Classification Search
CPC .... H04N 5/23238; H04N 7/155; H04N 7/188; G06Q 50/18
See application file for complete search history.

(56) References Cited

U.S. PATENT DOCUMENTS

| | | | |
|---|---|---|---|
| 2016/0182707 A1* | 6/2016 | Gabel | H04M 1/72424 |
| | | | 455/404.2 |
| 2018/0018869 A1* | 1/2018 | Ahmad | G05D 1/0246 |
| 2018/0025453 A1* | 1/2018 | Redmon | H04L 65/1069 |
| | | | 348/14.02 |

* cited by examiner

*Primary Examiner* — Hesham K Abouzahra
(74) *Attorney, Agent, or Firm* — The Iwashko Law Firm, PLLC; Lev Ivan Gabriel Iwashko

(57) ABSTRACT

A system to record areas around and within a vehicle, and to provide direct audio-visual and/or textual telephonic contact with a licensed attorney within a predetermined jurisdiction based on a location of a driver, the system including a server to store information related to a plurality of attorneys, a first mobile device having a mobile application running thereon to allow the driver to select the licensed attorney from the plurality of attorneys, a second mobile device having the mobile application running thereon to allow the selected licensed attorney to communicate with the driver in response to the attorney being selected by the driver, and a camera disposed within the vehicle to record the areas around and within the vehicle and to send a video file of the recording to the second mobile device.

15 Claims, 3 Drawing Sheets

SYSTEM AND DEVICE HAVING A MOBILE APPLICATION EXECUTED THEREON TO RECORD AREAS AROUND AND WITHIN A VEHICLE, AND TO PROVIDE DIRECT AUDIO-VISUAL AND/OR TEXTUAL TELEPHONIC CONTACT WITH A LICENSED ATTORNEY WITHIN A PREDETERMINED JURISDICTION BASED ON A LOCATION OF A USER

BACKGROUND

1. Field

The present general inventive concept relates generally to a system and device having a mobile application executed thereon to record areas around and within a vehicle, and to provide direct audio-visual and/or textual telephonic contact with a licensed attorney within a predetermined jurisdiction based on a location of a user.

2. Description of the Related Art

Law enforcement officers are tasked with a dangerous, yet necessary job, which includes observing traffic patterns in order to enforce road laws to maintain a safe driving situation for pedestrians, as well as people operating motor vehicles. As such, many drivers are detained by law enforcement officers every day, especially while driving their automobiles. For example, law enforcement officers use their judgment to pull over people driving their vehicles when they perceive that a law has been broken, such as driving over the speed limit, driving recklessly, failing to stop at a stop sign, failing to yield, failing to signal when making a turn, driving while intoxicated, and other perceived infractions.

However, law enforcement officers are not always correct when they pull over people driving their vehicles, as RADAR/LIDAR devices are not always accurate, and the officers are not always at the best vantage point to properly perceive exactly what the driver has done.

Moreover, there have been numerous cases where people have been unlawfully detained based on improper stop and search procedures, for reasons attributed to various types of profiling and discrimination.

Therefore, there is a need for a system and mobile application that records all activities conducted within and around a vehicle.

Also, there is a need for a system and mobile application that automatically connects a driver (who has been pulled over by a police officer or who has been in an accident) with an attorney licensed in the jurisdiction where the driver is located.

SUMMARY

The present general inventive concept provides a system and device having a mobile application executed thereon to record areas around and within a vehicle, and to provide direct audio-visual and/or textual telephonic contact with a licensed attorney within a predetermined jurisdiction based on a location of a user, and method thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a system to record areas around and within a vehicle, and to provide direct audio-visual and/or textual telephonic contact with a licensed attorney within a predetermined jurisdiction based on a location of a driver, the system including a server to store information related to a plurality of attorneys, a first mobile device having a mobile application running thereon to allow the driver to select the licensed attorney from the plurality of attorneys, a second mobile device having the mobile application running thereon to allow the selected licensed attorney to communicate with the driver in response to the attorney being selected by the driver, and a camera disposed within the vehicle to record the areas around and within the vehicle and to send a video file of the recording to the second mobile device.

The first mobile device may include an input unit to receive at least one of an input from the driver regarding information related to the driver, a selection of one of the plurality of attorneys, and a visualization mode of a display unit of the first mobile device.

The first mobile device may include a display unit to display a visual output including at least one of a list of the plurality of attorneys, profiles of the plurality of attorneys, a live stream of a video chat between the first mobile device and the second mobile device, and the video file.

The display unit may display the visual output in a split screen visualization.

The communication between the first mobile device and the second mobile device may include at least one of a video chat, a telephone call, a text message, and an audio chat.

The first mobile device may include a global positioning system (GPS) device to find a location of the first mobile device, and a communication unit to send the location of the first mobile device to the second mobile device, such that the second mobile device displays the location of the first mobile device on a map displayed on a display unit of the second mobile device.

The second mobile device may include an input unit to receive at least one of an input from the selected attorney regarding information related to the selected attorney, an accept client button, and a visualization mode of a display unit of the first mobile device.

The second mobile device may include a display unit to display a visual output including at least one of a profile of the driver, a live stream of a video chat between the first mobile device and the second mobile device, a location of the first mobile device on a map, and the video file.

The display unit may display the visual output in a split screen visualization.

The camera may initiate the recording in response to at least one of a detection of the first mobile device within a predetermined proximity of the camera and a driver-initiated input on an input unit of the first mobile device.

The foregoing and/or other features and utilities of the present general inventive concept may also be achieved by providing a system, including a server to store information related to a plurality of attorneys, a first mobile device to allow a user to select a licensed attorney from a plurality of attorneys, a second mobile device having the mobile application running thereon to allow the selected licensed attorney to communicate with the driver in response to the attorney being selected by the user, and a camera disposed within a vehicle to record areas around and within the vehicle and to send a video file of the recording to the second mobile device.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
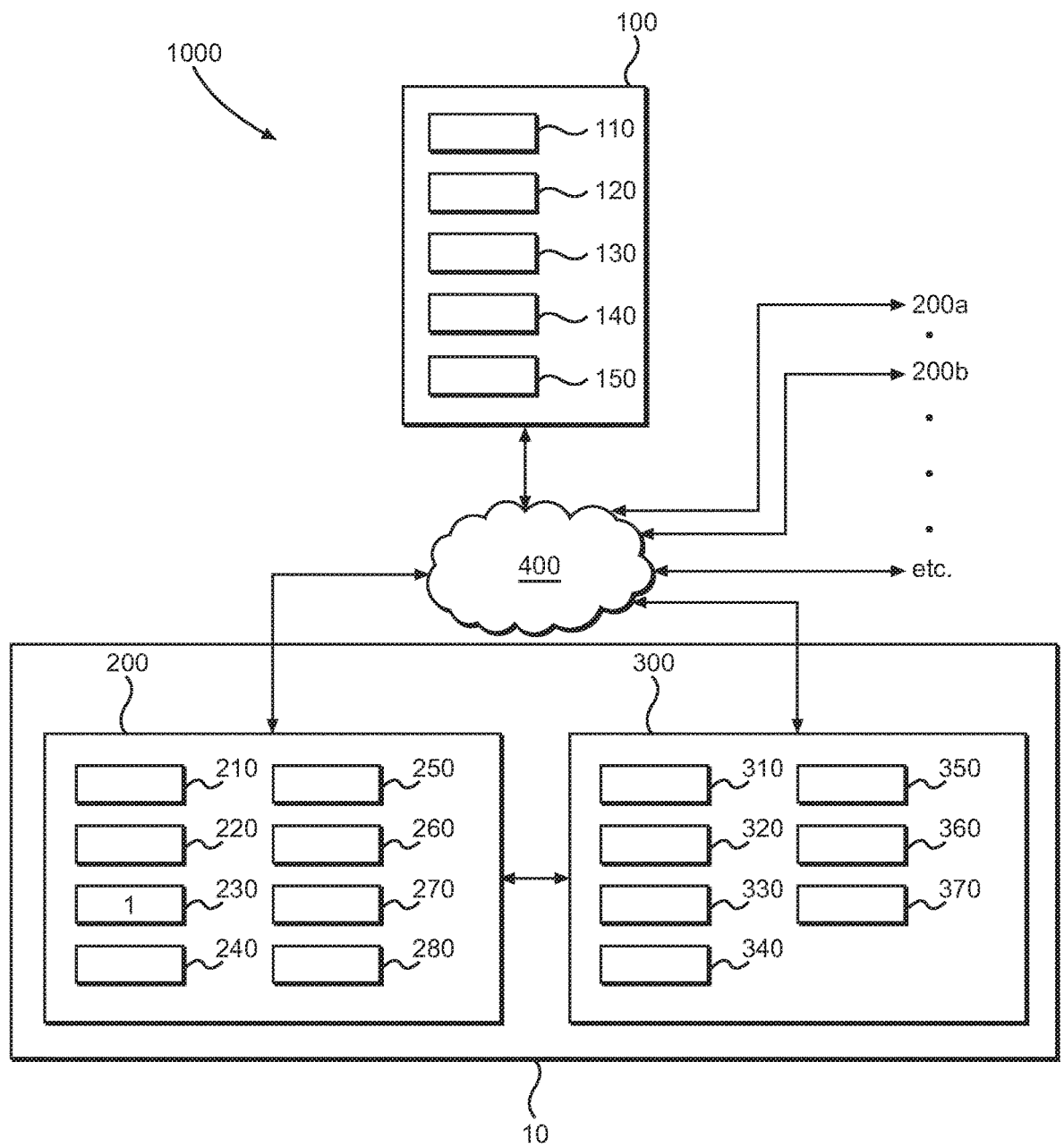
FIG. 1 illustrates a block diagram of a system to record areas around and within a vehicle, and to provide direct audio-visual and/or textual telephonic contact with a licensed attorney within a predetermined jurisdiction based on a location of a user, according to an exemplary embodiment of the present general inventive concept.

FIG. 1 illustrates a block diagram of a system 1000 to record areas around and within a vehicle 10, and to provide direct audio-visual and/or textual telephonic contact with a licensed attorney within a predetermined jurisdiction based on a location of a user, according to an exemplary embodiment of the present general inventive concept.

Here, direct telephonic contact may include any kind of contact that may be initiated and provided by a mobile device, including, but not limited to, video contact (e.g., a video conference), a telephone call, or an audio conference.

The system 1000 may include a server 100, a mobile device 200, a camera 300, and a network 400.

Figure 2:
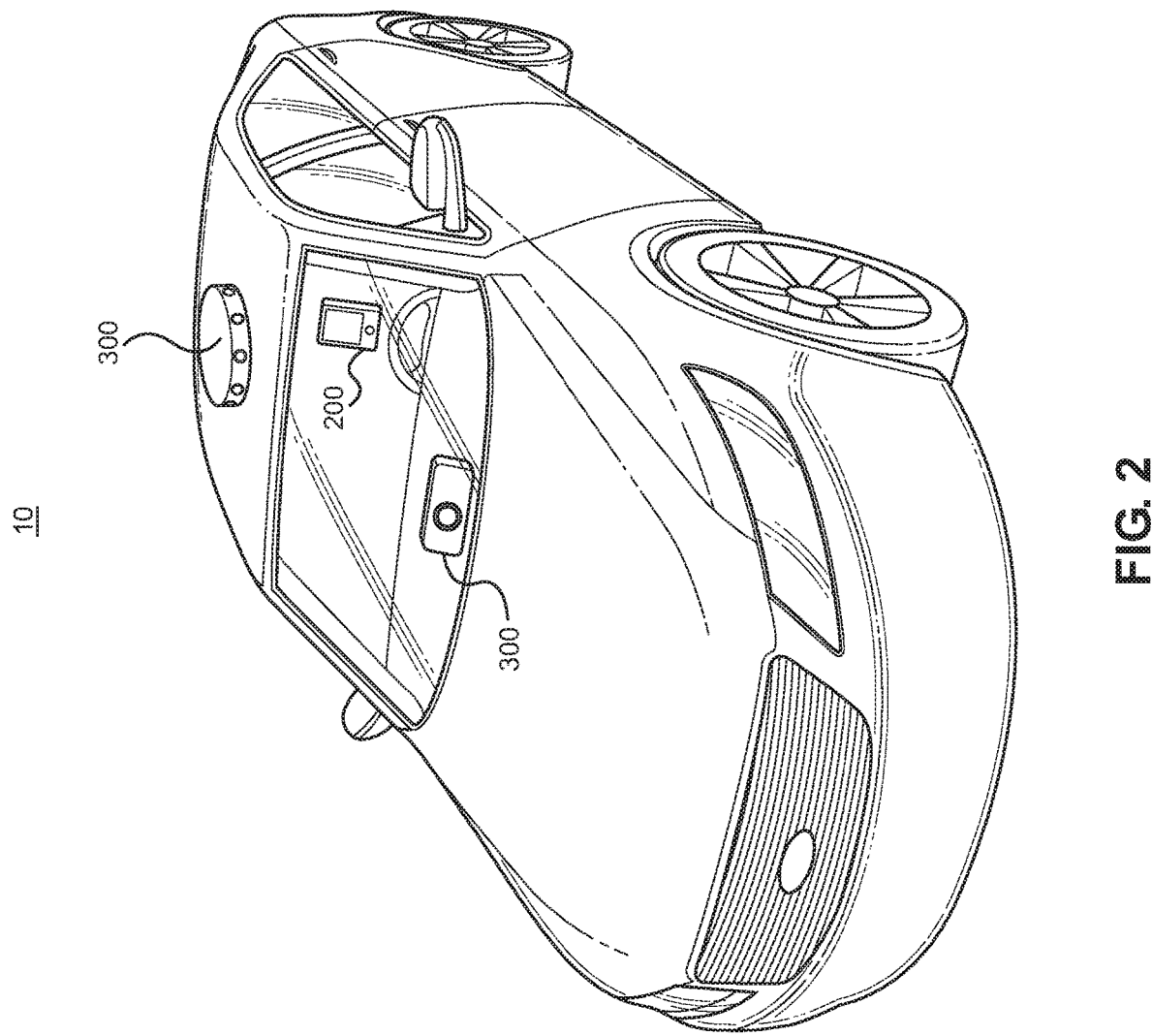
FIG. 2 illustrates a view of a mobile device and a camera disposed within the vehicle, according to an exemplary embodiment of the present general inventive concept.

FIG. 2 illustrates a view of the mobile device 200 and the camera 300 disposed within the vehicle, according to an exemplary embodiment of the present general inventive concept.

As illustrated in FIGS. 1 and 2, the mobile device 200 and the camera 300 may be disposed within or on the vehicle 10, and may communicate with the server 100 and with each other via the network 400.

The server 100 may include an input unit 110, a display unit 120, a processor 130, a communication unit 140, and a storage unit 150.

The input unit 110 may include a touch screen, a keyboard, a touchpad, a mouse, a trackball, a stylus, a voice recognition unit, a visual data reader, a camera, a wireless device reader, a dial, a button, and a holographic input unit, or any combination thereof, but is not limited thereto, and may include any type of input unit known to one of ordinary skill in the art. As such, the input unit 110 may receive data input directly by a user, or alternatively, may receive data directly from an outside source, or any source in communication with the server 100.

The display unit 120 may include a touch screen, a plasma screen, an LCD screen, a light emitting diode (LED) screen, an organic LED (OLED) screen, a computer monitor, a hologram output unit, a sound outputting unit, a projector, or any other type of device that visually or aurally displays data, but is not limited thereto, and may include any type of display unit known to one of ordinary skill in the art. When the display unit 120 is embodied as a touch screen, it may function as both the display unit 120 and the input unit 110.

The processor 130 (or central processing unit, CPU) may include electronic circuitry to carry out instructions of a computer program by performing basic arithmetic, logical, control and input/output (I/O) operations specified by the instructions. The processor 130 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processor 130 may also include a microprocessor and a microcontroller.

The communication unit 140 may include a device capable of wireless or wired communication between other wireless or wired devices via at least one of Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet, or any other communication device known to one of ordinary skill in the art.

The storage unit 150 may include a random access memory (RAM), a read-only memory (ROM), a hard disk, a flash drive, a database connected to the Internet, cloud-based storage, Internet-based storage, or any other type of storage unit.

The storage unit 150 of the server 100 may store any and all database information related to the system 1000. More specifically, the storage unit 150 may store various data, including, but not limited to, video files/audio files/picture files recorded by the camera 300, audio files related to telephone conversations conducted on and/or recorded by the mobile device 200, and any other documents that may be uploaded to the storage unit 150.

As such, the storage unit 150 may include a video file database 151, an audio file database 152, a picture file database 153, and a document database 154, but is not limited thereto.

A user may input the above data via the input unit 110 of the server 100, or the input unit 110 may automatically receive the above data to be saved in the storage unit 150. The user may also use the input unit 110 of the server 100 to access any of the above data stored in the storage unit 150, and as such, the display unit 120 may display the above data in list, thumbnail, detail, or any other format to allow the user to view the data.

The mobile device 200 may include an input unit 210, a display unit 220, a processor 230, a communication unit 240, a storage unit 250, a global positioning system (GPS) device 260, a microphone 270, and a speaker 280.

The input unit 210 may include a touch screen, a keyboard, a touchpad, a mouse, a trackball, a stylus, a voice recognition unit, a visual data reader, a camera, a wireless device reader, a dial, a button, and a holographic input unit, or any combination thereof, but is not limited thereto, and may include any type of input unit known to one of ordinary skill in the art. As such, the input unit 210 may receive data input directly by a user, or alternatively, may receive data directly from an outside source, or any source in communication with the mobile device 200.

The display unit 220 may include a touch screen, a plasma screen, an LCD screen, a light emitting diode (LED) screen, an organic LED (OLED) screen, a computer monitor, a hologram output unit, a sound outputting unit, a projector, or any other type of device that visually or aurally displays data, but is not limited thereto, and may include any type of display unit known to one of ordinary skill in the art. When the display unit 220 is embodied as a touch screen, it may function as both the display unit 220 and the input unit 210.

The processor 230 (or central processing unit, CPU) may include electronic circuitry to carry out instructions of a computer program by performing basic arithmetic, logical, control and input/output (I/O) operations specified by the instructions. The processor 230 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processor 230 may also include a microprocessor and a microcontroller.

The communication unit 240 may include a device capable of wireless or wired communication between other wireless or wired devices via at least one of Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The storage unit 250 may include a random access memory (RAM), a read-only memory (ROM), a hard disk, a flash drive, a database connected to the Internet, cloud-based storage, Internet-based storage, or any other type of storage unit.

The GPS device 260 may be utilized by the mobile device 200 in order to pinpoint an exact location of the mobile device 200, using satellite and global positioning technology.

The microphone 270 may be used by a user to speak into the mobile device 200 to allow for communications from the mobile device 200 to other mobile devices 200*a*, 200*b*, etc., and the a microphone 270, and the speaker 280 may be used by the user to allow the user to hear communications from mobile devices 200*a*, 200*b*, etc. and/or to hear videos or audio played on the mobile device 200.

The mobile device 200 may receive data from the camera 300, or alternatively, direct input entered by a user into the input unit 210 of the apparatus 200. The data may be stored in the storage unit 250 of the apparatus 200, and then sent to the server 100 via the communication unit 240 of the apparatus 200. The data may be analyzed by the server 100 and then sent back to the mobile device 200 to be displayed by the display unit 220 of the apparatus 200. All of the above actions may be controlled by the processor 230 of the apparatus 200.

Any of the outputs generated by the server 100 may be displayed on the display unit 120 of the server 100 or the display unit 220 of the apparatus 200. Likewise, any of the outputs generated by the apparatus 200 may be displayed on the on the display unit 120 of the server 100 or the display unit 220 of the apparatus 200.

The mobile device 200 may have an application 1 executed thereby and/or running thereon, which may be opened by the user manually, or may be running in the background on the processor 230. The application 1 may be a program that records areas within and around the vehicle 10 while the user is driving the vehicle 10 (an also when the vehicle 10 has stopped, based on the user's preference), and provides direct telephonic communication via the communication unit 240 with an attorney. Specifically, the GPS device 260 may pinpoint an exact location of the mobile device 200, and the processor 230 may communicate with the storage unit 150 of the server via the application 1 in order to locate an attorney within a jurisdiction and proximity of the mobile device 200. Then, the mobile device 200 may automatically (or manually) communicate with the attorney within the appropriate jurisdiction.

Referring to FIG. 1, a plurality of other mobile devices 200*a*, 200*b*, etc. are illustrated as examples of mobile device that may be utilized by various attorneys, while the mobile device 200 is illustrated as an example of a mobile device that may be utilized by a driver (i.e., someone potentially seeking an attorney). However, all the mobile devices 200, 200a, 200b, etc., may include similar components, although different types of user accounts (e.g., driver, attorney, etc.) may be utilized by the different mobile devices.

The camera 300 may include any type of camera known to one of ordinary skill in the art, including, but not limited to, an action camera, an animation camera, an autofocus camera, a box camera, a camcorder, a camera phone, a compact camera, a dashboard camera (i.e., a Dashcam), a digital camera, a field camera, a FIREWIRE camera, a helmet camera, a high-speed camera, an instant camera, a keychain camera, a live-preview digital camera, a movie camera, an omnidirectional camera, a pinhole camera, a pocket camera, a pocket video camera, a rangefinder camera, a reflex camera, a remote camera, a stereo camera, a still camera, a still video camera, a subminiature camera, a system camera, a thermal imaging camera, a thermographic camera, a traffic camera, a traffic enforcement camera, a twin-lens reflex camera, a video camera, a view camera, a webcam, a WRIGHT camera, a ZENITH camera, a zoom-lens reflex camera.

However, the camera 300 may preferably have capabilities to send data therefrom via the network 400.

The camera 300 may include components commonly found on and/or within a camera, including, but not limited to, an input unit 310, a display unit 320, a processor 330, a communication unit 340, a storage unit 350, a microphone 360, and a speaker 370.

The input unit 310 may include a touch screen, a keyboard, a touchpad, a mouse, a trackball, a stylus, a voice recognition unit, a visual data reader, a wireless device reader, a dial, a button, and a holographic input unit, or any combination thereof, but is not limited thereto, and may include any type of input unit known to one of ordinary skill in the art.

The input unit 310 may also include at least one lens 311 that may be utilized to capture moving images and/or still images.

The moving images and/or still images may be saved and stored within the storage unit 350 as any type of file, including, but not limited to, .OGG, .MP4, .M4P, .M4V, .AVI, .MPG, .MP2, .MPEG, .MPE, .MPV, .WEBM, .3GP, .ASF, .JPG, .GIF, TIFF, PNG, Raw Image Files, Flash Video Format, QUICKTIME, and WINDOWS Media Video Format.

Also, any of the above file types (i.e., the recorded data) may be sent via the communication unit 340 to either the mobile devices 200, 200a, 200b, etc., or the server 100.

The display unit 320 may include a plasma screen, an LCD screen, a light emitting diode (LED) screen, an organic LED (OLED) screen, a computer monitor, a hologram output unit, a sound outputting unit, a projector, or any other type of device that visually or aurally displays data, but is not limited thereto, and may include any type of display unit known to one of ordinary skill in the art. The display unit 320 may display a real-time image of what the camera 300 is recording.

The processor 330 (or central processing unit, CPU) may include electronic circuitry to carry out instructions of a computer program by performing basic arithmetic, logical, control and input/output (I/O) operations specified by the instructions. The processor 230 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processor 330 may also include a microprocessor and a microcontroller. The processor 330 may work in conjunction with the lens 311 of the input unit 310 to properly capture videos and/or pictures of all desired images.

The communication unit 340 may include a device capable of wireless or wired communication between other wireless or wired devices via at least one of Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The storage unit 350 may include a random access memory (RAM), a read-only memory (ROM), a hard disk, a flash drive, a database connected to the Internet, cloud-based storage, Internet-based storage, or any other type of storage unit. The storage unit 350 may storage any of the videos, images, and/or footage captured by the input unit 310.

The microphone 360 may capture audio emitted by a user, and the speaker 370 may be used by the user to hear audio from video and/or audio files played by the camera 300.

The network 400 may be any type of network known to one of ordinary skill in the art, including, but not limited to, a network that provides support for including, but not limited to, at least one of the Internet, a cellular network, a universal mobile telecommunications systems (UMTS) network, a Long Term Evolution (LTE) network, a Global System for Mobile Communications (GSM) network, a local area network (LAN), a virtual private network (VPN) coupled to the LAN, a private cellular network, a private telephone network, a private computer network, a private packet switching network, a private line switching network, a private wide area network (WAN), a corporate network, or any number of private networks that can be referred to as an Intranet.

As such, communication between the server 100, the mobile device 200, and the camera 300 may occur via any type of wired or wireless network 300 known to one of ordinary skill in the art, as described above.

The Mobile Application

Figure 3B:
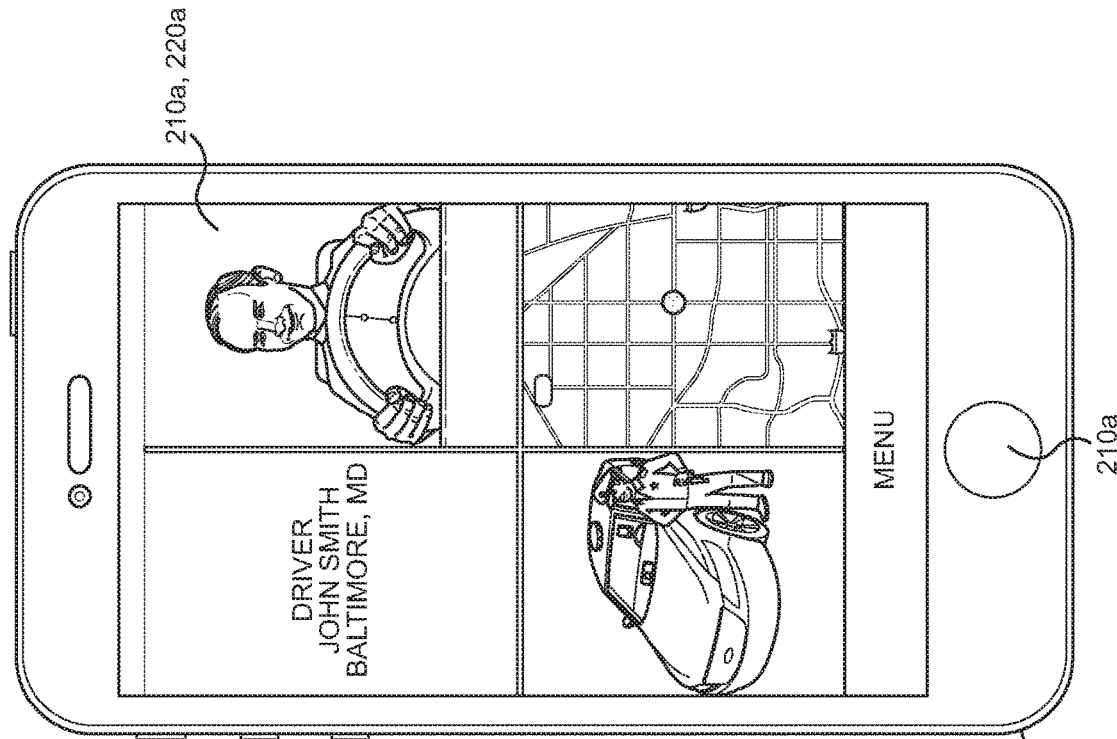
FIG. 3B illustrates a view of a mobile device displaying another screen of a mobile application to provide direct audio-visual and/or textual telephonic contact with a driver, according to an exemplary embodiment of the present general inventive concept.
Figure 3A:
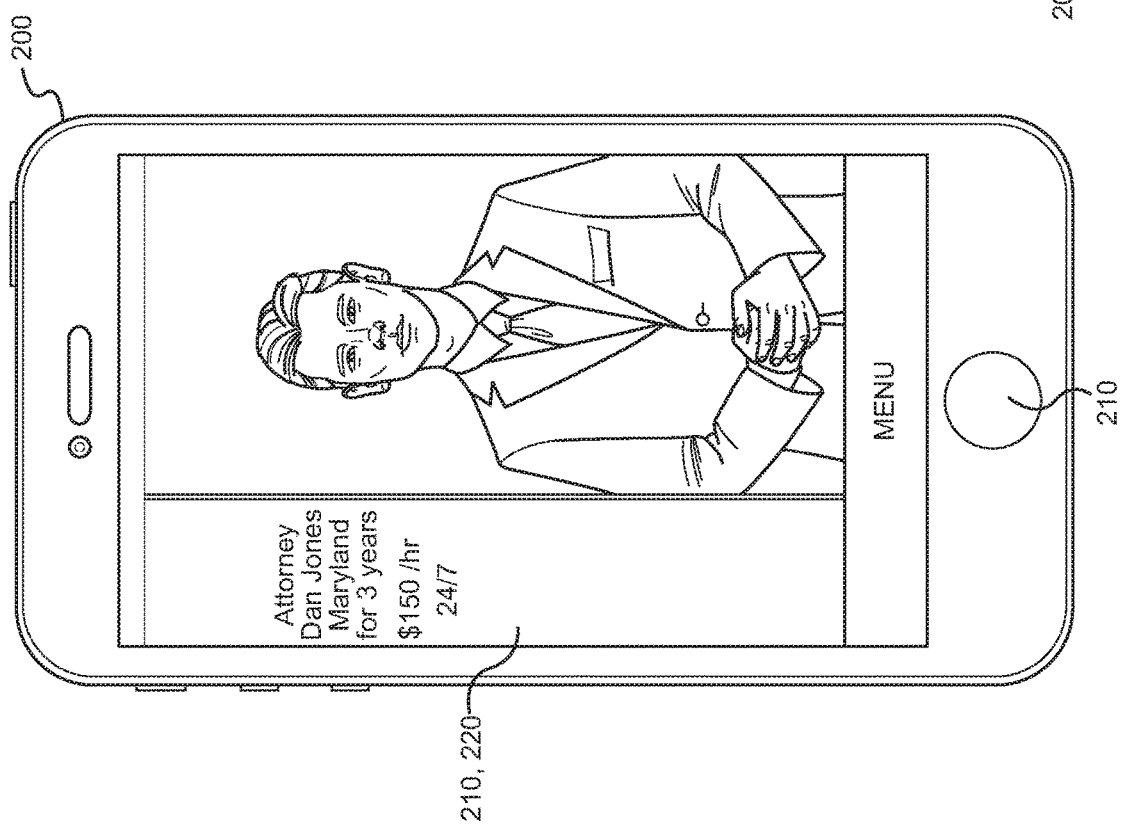
FIG. 3A illustrates a view of a mobile device displaying a screen of a mobile application to provide direct audio-visual and/or textual telephonic contact with a licensed attorney within a predetermined jurisdiction based on a location of a user, according to an exemplary embodiment of the present general inventive concept.

FIG. 3A illustrates a view of a mobile device 200 displaying a screen of a mobile application to provide direct audio-visual and/or textual telephonic contact with a licensed attorney within a predetermined jurisdiction based on a location of a user, according to an exemplary embodiment of the present general inventive concept.

FIG. 3B illustrates a view of a mobile device displaying another screen of a mobile application to provide direct audio-visual and/or textual telephonic contact with a driver, according to an exemplary embodiment of the present general inventive concept.

Referring to FIGS. 3A and 3B, the mobile application 1 may be downloaded onto the mobile devices, 200, 200a, 200b, etc., or installed thereon directly.

The mobile application 1 may be accessed by the mobile device 200, or any other mobile device that has a capability to receive a download and installation of the mobile application 1 thereupon, such as the mobile devices 200a, 200b, etc.

The mobile application 1 may be designed and programmed to interact with and provide communication between the server 100, the mobile device 200, the camera 300, and any other mobile devices 200a, 200b, etc.

Hereinafter, functions and uses of the mobile device 200 and the mobile application 1 running thereon will be described as being used by a driver of the vehicle 10. Also, functions and uses of the mobile devices 200a, 200b, etc. and the mobile applications 1a, 1b, etc. running thereon, respectively, will be described as being used by attorneys. However, it is important to note that the mobile application 1 is the same downloadable application for all users, but the difference between mobile application 1 and mobile applications 1a, 1b, etc. is merely that the driver is using the mobile application 1 on the mobile device 200, while attorneys are using the mobile applications 1a, 1b, etc. on the mobile devices 200a, 200b, etc., respectively.

As such, the driver using the mobile device 200 may sign up to use the mobile application 1 with "a driver account," while attorneys using the mobile devices 200a, 200b, etc. may sign up to use the mobile applications 1a, 1b, etc. with "attorney accounts."

Both the driver accounts and the attorney accounts may be paid-for by users on an "a la carte" basis or a subscription basis, or alternatively, may be downloadable and usable for free by all users.

The driver account may be accessed and utilized by anyone having a valid driver's license. A valid driver's license may be verified by the mobile application 1, by having the driver take a photo of the driver's license using the input unit 210 (e.g., a camera) of the mobile device 200. The mobile application 1 may then be used to access a database of licensed drivers (e.g., a database of the DMV), in order to verify that the driver's license is valid, up to date, and not suspended. (This adds an additional benefit for the driver, because oftentimes, drivers do not know when their licenses have been suspended.)

The mobile application 1 may also be used by a driver using the mobile device 200, in order to allow the driver to set up a driver user profile. The mobile application 1 may include a driver user profile screen that allows the driver to input various criteria, including, but not limited to, name, username, password, bank account information, credit card information (for automatic withdrawals from the user's bank account), address, and any other information pertinent to the driver.

The attorney accounts may be accessed and utilized by anyone who has a valid license to practice law in a particular jurisdiction. The mobile application 1a, for example, may be used by an attorney using the mobile device 200a, in order to allow the attorney to set up an attorney user profile. The mobile application 1a may include an attorney user profile screen that allows the attorney to input various criteria, including, but not limited to, name, username, password, bank account information, credit card information (for automatic withdrawals from the user's bank account), address, resume information, experience, types of law practiced, jurisdictions in which the attorney practices, college/law school attended by the attorney, bar licensing information, dates/times of availability, hourly fee rates, flat fee rates, and any other information pertinent to the attorney.

The user profiles (both driver user profiles and attorney user profiles) may all be stored within the storage unit 150 of the server 100, to be accessible by the mobile devices 200, 200a, 200b, etc., via the mobile applications 1, 1a, 1b, etc., respectively.

When a user (e.g., driver) enters the vehicle 10, the mobile device 200 may sense (via BLUETOOTH, NFC, or other similar type of sensing method) that the mobile device 200 is within a predetermined proximity of the camera 300, and thus, may open the mobile application 1 and also control the camera 300 to turn on. Alternatively, the driver may manually activate the mobile application 1 and turn on the camera 300. Also, the camera 300 may be operated manually to begin recording, or alternatively, may begin recording automatically when the mobile device 200 enters the vehicle 10.

The camera 300 may be a single omnidirectional camera, or alternatively, may include a plurality of cameras 300 disposed around various portions of the vehicle 10. Specifically, it is imperative that the camera 300 is able to record all areas around and within the vehicle 10, as the recordings may later be used as a defense in court. For example, the camera 300 may include a speedometer of the vehicle 10, actions of the driver, and conditions within the vehicle 10.

As such, the camera 300 may have capabilities of recording an area in front of the vehicle 10 (e.g., a dashcam type of recording), an area behind the vehicle 10 (e.g., a rear-view camera type of recording), areas on sides of the vehicle 10 (e.g., side-view camera types of recordings), areas all around an outside of the vehicle 10 (a 360-degree recording), and an area within the vehicle 10 (e.g., a close-proximity fish-eye omnidirectional type of recording).

Although FIG. 2 illustrates that the camera 300 may be on top of the vehicle 10, alternatively, the same camera 300 may be disposed inside the vehicle 10.

When the camera 300 is turned on and begins recording, the recorded data may be stored within the camera 300 as a video file, an image file, an audio file, or any combination thereof.

Also, any of the above file types (i.e., the recorded data) may be sent via the communication unit 340 to either the mobile devices 200, 200a, 200b, etc., or the server 100.

Furthermore, the camera 300 may send the images recorded thereupon to the mobile devices 200, 200a, 200b, etc. in real time.

While the driver is driving the vehicle 10, a law enforcement officer may pull the driver over due to a perceived driving infraction allegedly committed by the driver. During the entire driving time, however, the camera 300 has been recording the entire area around and within the vehicle 10, and the mobile application 1 has been allowing the camera 300 to send the recorded videos as video files to the server 100 and/or the mobile device 200 of the driver.

Therefore, when the driver is pulled over, the driver may use the input unit 210 to access the mobile application 1 running on the mobile device 200, in order to run an automatic search for attorneys accessible by the mobile application 1. In other words, when attorneys have signed up to use the mobile applications 1, 1a, 1b, etc., and thus have their profiles saved on the server 100, they are searchable via the mobile application 1 using the mobile device 200. The mobile application 1 may restrict a search for attorneys based on a location of the mobile device 200 by utilizing location data of the mobile device 200 that has been acquired by the GPS device 260. As such, the driver may be confident that only attorneys that are licensed to practice law in the jurisdiction in which the driver was detained will be provided to the driver.

After the attorney search is completed by the mobile application 1, a plurality of local attorneys licensed to practice law in the proper jurisdiction may be displayed on the display unit 220 of the driver's mobile device 200 in an order of proximity, skill, experience level, ranking, rating, or any other criteria desired and/or predetermined/preset by the driver. Any of the aforementioned data related to the attorneys may be displayed on the display unit 220 of the driver's mobile device 200 in list form, or any other form selectable by the driver.

Preferably, only attorneys that are presently available to speak will be displayed on the display unit 220 of the driver's mobile device 200.

The driver may subsequently select one of the attorneys manually using the input unit 210, by, for example, tapping on the attorney's name, picture, profile, etc. Alternatively, the driver may preset an automatic attorney selection operation request, which will allow the mobile application 1 to automatically select an attorney from the list of attorneys when the driver inputs the request on the input unit 210.

In order increase expeditiousness, efficiency and efficacy, the driver may also preset a list of attorneys for automatic attorney selection operation requests, which will automatically defer to and dial, in turn, subsequent attorneys on the list, should the first attorney contacted be unavailable or unresponsive at that time. Should none of the attorneys from the preset list be available, user may then select an available attorney of his choice from the plurality of attorneys displayed on the display unit 220 of the driver's mobile device 200.

Once the attorney is selected by the driver via the mobile application 1 using the input unit 210 of the mobile device 200, the mobile application 1 may initiate an automatic video chat, text message, and/or phone call with the selected attorney.

Alternatively, after the attorney is selected by the driver via the mobile application 1 using the input unit 210 of the mobile device 200, the mobile application 1a of the mobile device 200a may produce an alert for the attorney, so that the attorney may choose whether to communicate with the driver.

When the automatic video chat and/or phone call with the selected attorney is initiated, the selected attorney may be contacted on the mobile device 200a via the mobile application 1a, so that the selected attorney may communicate with the driver in real time. In other words, cameras disposed on the mobile device 200 and 200a may allow the driver to communicate with the selected attorney in real time. Alternatively, the driver may choose to simply call the attorney such that only the attorney's voice is heard.

Also, the video file recorded by the camera 300 may be sent to the mobile device 200a of the attorney, to allow the attorney to see the footage captured by the camera 300. The footage may also be sent to the mobile device 200 of the driver for the driver's records.

When any of mobile devices 200, 200a, 200b, etc. receive the recorded videos from the camera 300, a multi-sectional split screen may be displayed on the display units 220, 220a, 220b, etc. However, the display units 220, 220a, 220b, etc. may display multi-sectional split screens for a myriad of reasons and/or applications.

For example, the mobile device 200 of the driver may display on the display unit 220 a split screen, where one half of the split screen of the display unit 220 may display contact information of the selected attorney in the jurisdiction where the driver has been detained, and another half of the split screen of the display unit 220 may display a live streaming video feed (e.g., a video chat) with the selected attorney to allow the driver to communicate directly with the selected attorney.

As another example, the mobile device 200a of the attorney may display on the display unit 200a, a quadruple split screen, where an upper left portion of the split screen may display a profile of the driver, an upper right portion of the split screen may display a live streaming video feed (e.g., a video chat) with the driver, a bottom left portion of the split screen may display the recorded video of the area around and within the vehicle 10 (including current recordings), and a bottom right portion of the split screen may display a map showing where the driver using the mobile device 200 is presently located. However, the split screens displayed on the display unit 200a may be arranged in any manner desired by the attorney, and multiple video screens of recordings may alternatively be displayed on the display unit 200a.

The mobile application 1 may allow the live streaming video chat between the attorney and the driver to be recorded and saved within the storage units 250, 250a, and 150, and the video recordings by the camera 300 may continue during the entire detention by the law enforcement officer.

Any and all recordings by the camera 300 may be saved within the storage units 250, 250a, and 150 for later access and use in court and/or by the driver's attorney.

The live streaming video chat displayed on the display unit 220 of the mobile device 200 of the driver may be utilized by the driver to allow the law enforcement officer to communicate directly with the attorney. As such, the attorney may quickly review the recorded video, and provide legal aid to the driver, as well as explanations and proof to the law enforcement officer, in order to avoid a potential ticket.

The mobile application 1 may also be utilized to provide payment directly from the driver to the attorney if the attorney is retained as defense counsel for the driver. As such, bank accounts of the driver and the attorney may be linked to the mobile application 1 for direct and immediate transfer of funds between the driver and the attorney.

As another example, if the driver is involved in a car accident, the mobile application 1 may be used to allow the driver to receive the best real-time legal advice possible regarding the accident, based on the recordings conducted in and around the vehicle 10.

Users may rate each other regarding services that were provided by attorneys, and/or payments that were provided by drivers. As such, attorneys and drivers may also select whether to get involved with particular users based on ratings received in the past by other users.

Optionally, the mobile application 1 may allow the attorney to receive a nominal fee when contacted by the driver (such as $50, for example), in order to allow the attorney to receive some type of payment, even if the attorney is not retained by the driver. As such, the funds would be transferred from the driver's linked bank account to the attorney's linked bank account after the communication between the driver and the attorney has ended, or at a time determined by the driver, the attorney, or the mobile application 1.

The present general inventive concept may reduce possibilities of altercations between police officers and motor vehicle drivers.

The present general inventive concept may also preserve a driver's Miranda rights, including the right to remain silent, and the right to an attorney.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A system to record areas around and within a vehicle, and to provide direct audio-visual and/or textual telephonic contact with a licensed attorney within a predetermined jurisdiction based on a location of a driver, the system comprising:

a server to store information related to a plurality of attorneys;

a first mobile device having a mobile application running thereon to conduct a search among the plurality of attorneys, the search being restricted based on a location of the first mobile device, and to allow the driver to select the licensed attorney from the plurality of attorneys displayed on the first mobile device that are presently available to speak and based on predetermined criteria selectable by the driver, such that the mobile application allows verification of a driver's license of the driver;

a second mobile device having the mobile application running thereon to allow the selected licensed attorney to communicate with the driver in response to the attorney being selected by the driver; and a camera disposed within the vehicle to record the areas around and within the vehicle and to send a video file of the recording to the second mobile device.

2. The system of claim 1, wherein the first mobile device comprises:
an input unit to receive at least one of an input from the driver regarding information related to the driver, a selection of one of the plurality of attorneys, and a visualization mode of a display unit of the first mobile device.

3. The system of claim 1, wherein the first mobile device comprises:
a display unit to display a visual output including at least one of a list of the plurality of attorneys, profiles of the plurality of attorneys, a live stream of a video chat between the first mobile device and the second mobile device, and the video file.

4. The system of claim 3, wherein the display unit displays the visual output in a split screen visualization.

5. The system of claim 1, wherein the communication between the first mobile device and the second mobile device comprises at least one of a video chat, a telephone call, a text message, and an audio chat.

6. The system of claim 1, wherein the first mobile device comprises:
a global positioning system (GPS) device to find a location of the first mobile device; and
a communication unit to send the location of the first mobile device to the second mobile device, such that the second mobile device displays the location of the first mobile device on a map displayed on a display unit of the second mobile device.

7. The system of claim 1, wherein the second mobile device comprises:
an input unit to receive at least one of an input from the selected attorney regarding information related to the selected attorney, an accept client button, and a visualization mode of a display unit of the first mobile device.

8. The system of claim 1, wherein the second mobile device comprises:
a display unit to display a visual output including at least one of a profile of the driver, a live stream of a video chat between the first mobile device and the second mobile device, a location of the first mobile device on a map, and the video file.

9. The system of claim 8, wherein the display unit displays the visual output in a split screen visualization.

10. The system of claim 1, wherein the camera initiates the recording in response to at least one of a detection of the first mobile device within a predetermined proximity of the camera and a driver-initiated input on an input unit of the first mobile device.

11. The system of claim 1, wherein the predetermined criteria is selected from at least one of a proximity of the licensed attorney, a skill of the licensed attorney, an experience level of the licensed attorney, a college/law school attended by the licensed attorney, bar licensing information of the licensed attorney, dates and/or times of availability of the licensed attorney, hourly fee rates of the licensed attorney, and flat fee rates of the licensed attorney.

12. The system of claim 1, wherein the information related to the plurality of attorneys is stored on the server for each of the plurality of attorneys in separate profiles corresponding to each of the plurality of attorneys.

13. The system of claim 1, wherein the first mobile device using the mobile application is used to take a photo of the driver's license of the driver to perform the verification of the driver's license of the driver.

14. A system to record areas around and within a vehicle, and to provide direct audio-visual and/or textual telephonic contact with a licensed attorney within a predetermined jurisdiction based on a location of a driver, the system comprising:
a server to store information related to a plurality of attorneys;
a first mobile device having a mobile application running thereon to conduct a search among the plurality of attorneys, the search being restricted based on a location of the first mobile device, and to allow the driver to select the licensed attorney from the plurality of attorneys displayed on the first mobile device that are presently available to speak and based on predetermined criteria selectable by the driver, such that the mobile application allows verification of a driver's license of the driver;
a second mobile device having the mobile application running thereon to allow the selected licensed attorney to communicate with the driver in response to the attorney being selected by the driver; and
a camera disposed within the vehicle to record the areas around and within the vehicle and to send a video file of the recording to the second mobile device.

15. The system of claim 14, wherein the first mobile device using the mobile application is used to take a photo of the driver's license of the driver to perform the verification of the driver's license of the driver.

* * * * *